United States Patent [19]
Byrne

[11] Patent Number: 6,036,516
[45] Date of Patent: *Mar. 14, 2000

[54] ELECTRICAL INTERCONNECTION ASSEMBLY WITH ADDITIONAL OUTLET RECEPTACLES

[76] Inventor: Norman R. Byrne, 2736 Honey Creek NE., Ada, Mich. 49301

[*] Notice: This patent issued on a continued prosecution application filed under 37 CFR 1.53(d), and is subject to the twenty year patent term provisions of 35 U.S.C. 154(a)(2).

[21] Appl. No.: 08/763,688

[22] Filed: Dec. 11, 1996

Related U.S. Application Data

[60] Provisional application No. 60/008,448, Dec. 11, 1995.

[51] Int. Cl.$^7$ .................................................. H01R 25/00
[52] U.S. Cl. ........................................... 439/215; 439/654
[58] Field of Search ........................... 439/215, 207–213, 439/654; 174/48, 49

[56] References Cited

U.S. PATENT DOCUMENTS

| | | | |
|---|---|---|---|
| 4,551,577 | 11/1985 | Byrne | 174/57 |
| 4,762,072 | 8/1988 | Boundy et al. | 108/50 |
| 5,013,252 | 5/1991 | Nienhuis et al. | 439/215 |
| 5,073,120 | 12/1991 | Lincoln et al. | 439/215 |
| 5,096,431 | 3/1992 | Byrne | 439/171 |
| 5,096,434 | 3/1992 | Bynre | 439/215 |
| 5,164,544 | 11/1992 | Snodgrass et al. | 439/215 |
| 5,178,555 | 1/1993 | Kilpatrick et al. | 439/215 |
| 5,259,787 | 11/1993 | Byrne | 439/557 |

OTHER PUBLICATIONS

AMP Products for the office of the 80's and beyond;AMP, Incorporated; 1984.

*Primary Examiner*—Gary F. Paumen
*Attorney, Agent, or Firm*—Varnum, Riddering, Schmidt & Howlett LLP

[57] ABSTRACT

An electrical interconnection assembly for use in a spcedivider wall system including a plurality of modular upright wall panels having vertically extending opposite end edges and a raceway area extending between the opposite edges for supporting electrical conductors and junction blocks, the assembly adapted to be mounted in the raceway and comprising:

at least one junction block for receiving electrical receptacles;

a plurality of first receptacle connectors formed integral to the junction block for interchangeably receiving electrical outlet receptacles and at least one power cable;

the at least one power cable attaching between the junction block and a power source for supplying power to the junction block;

the junction block being a two-sided junction block with at least two of the first receptacle connectors being oppositely directed, the junction block further comprising at least one inside second receptacle connector on at least one side of the junction block to accommodate electrical outlet receptacles;

an extension receptacle block connected to one of the oppositely directed first receptacle connectors on the junction block for providing additional connectors for power equipment, the extension receptacle block comprising a further inside second receptacle connector; and a further electrical outlet receptacle connected to the further inside second receptacle connector.

3 Claims, 5 Drawing Sheets

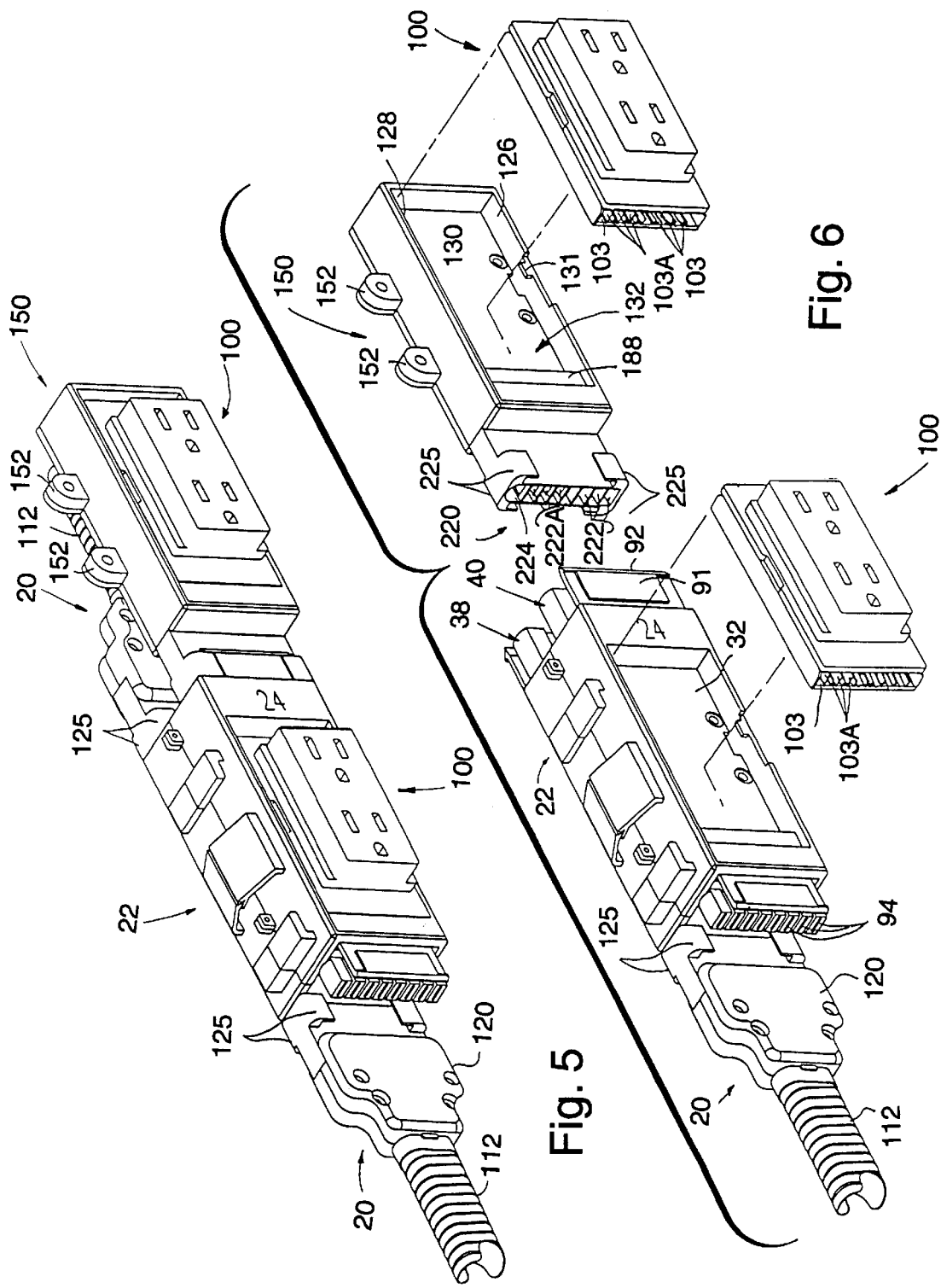

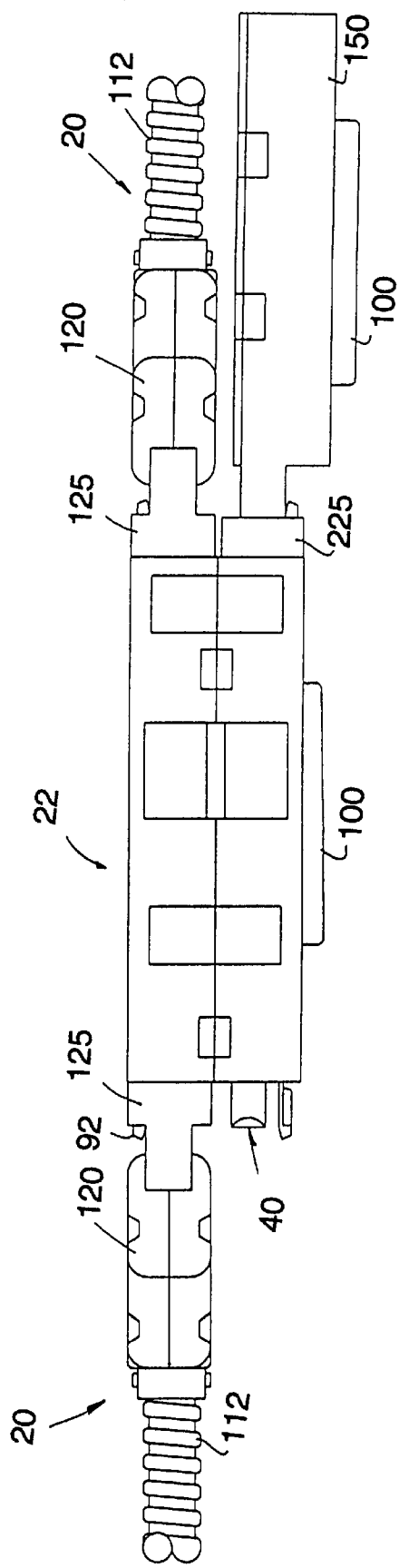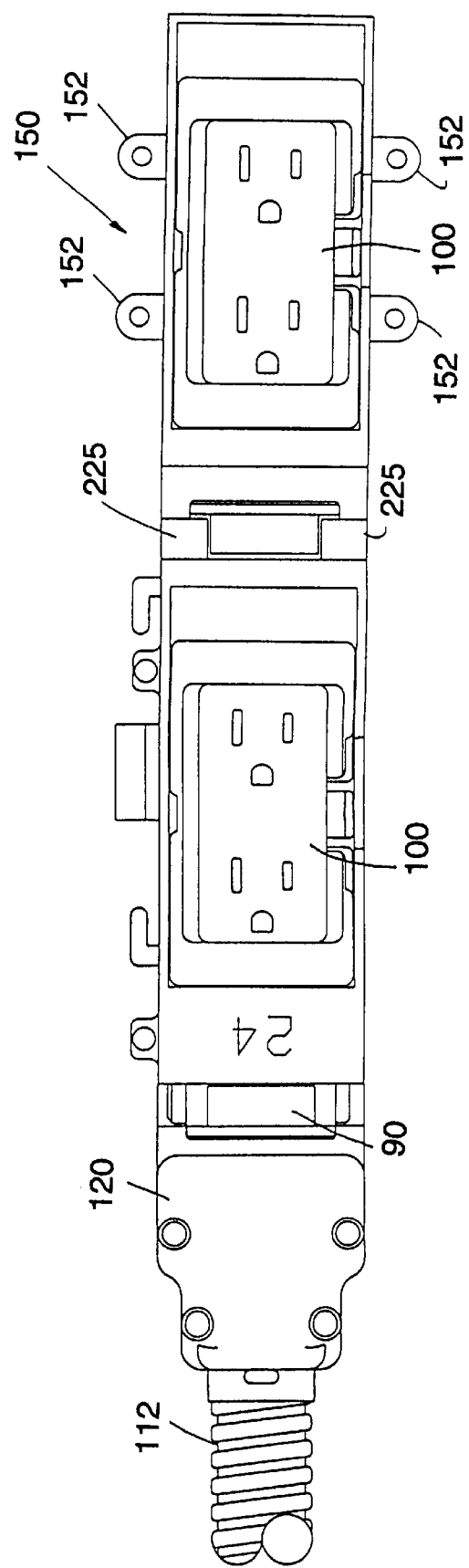

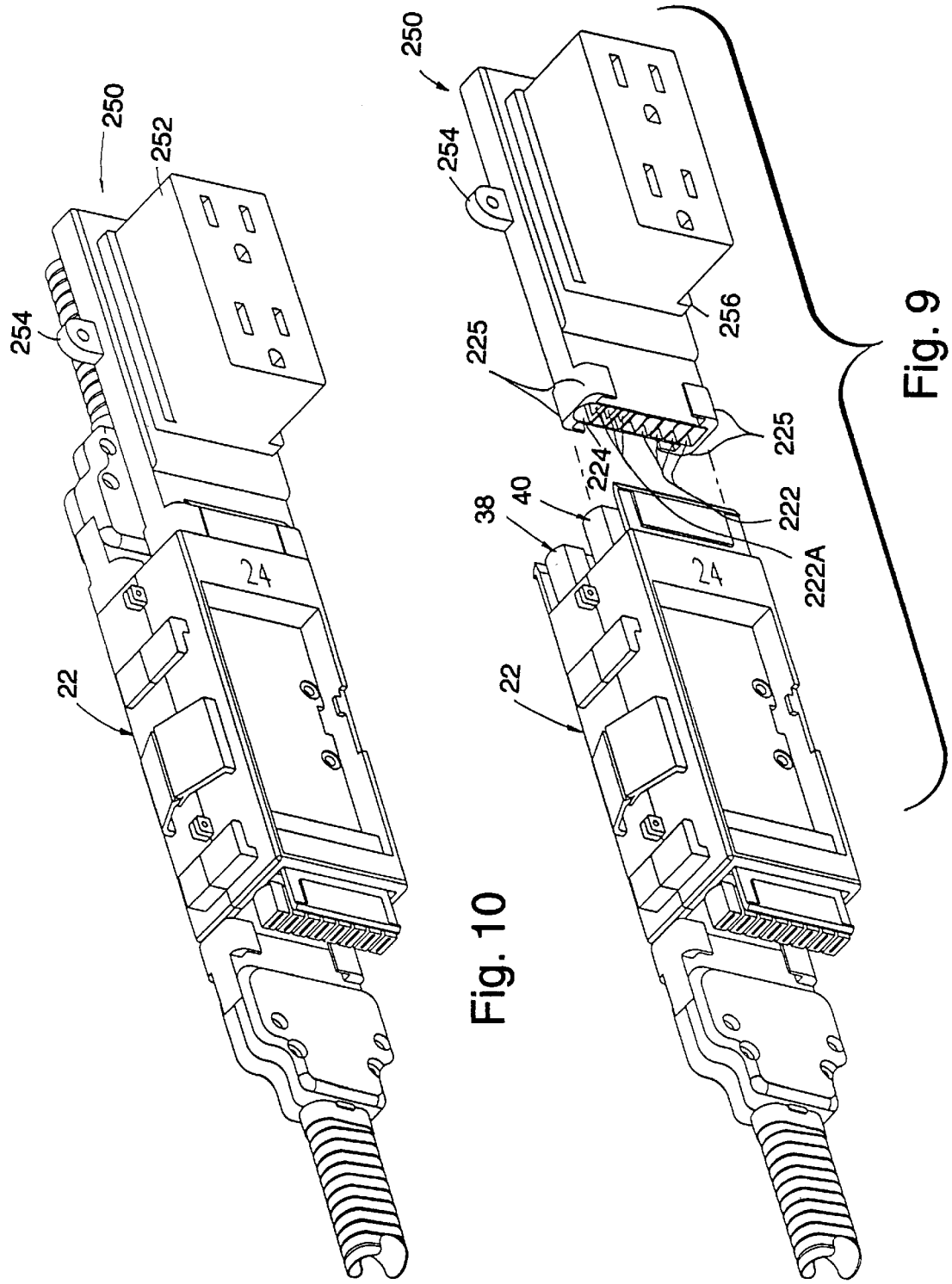

ELECTRICAL INTERCONNECTION ASSEMBLY WITH ADDITIONAL OUTLET RECEPTACLES

This application claims priority on provisional application 60/008,448 filed Dec. 11, 1995.

BACKGROUND OF THE INVENTION

1. Field of the Invention

The invention pertains to electrical interconnection systems and more particularly to such systems for use in distributing electrical power to modular wall panels or the like.

2. Prior Art

Known interior wall systems typically employ prefabricated modular wall units which are joined together in various configurations to divide a work space into smaller offices or work areas. Generally, such modular wall panels are equipped with raceways, for example along a bottom edge of the modular panels, for housing electrical cabling and junction blocks in order to provide electrical outlets and electrical power connections to adjacent panels. The raceway of a modular wall unit may be provided with a male connector at one end and a female connector at another end and a pair of junction blocks, each provided with electrical outlets, disposed at spaced-apart positions along the raceway. Conduits, extending between the junction blocks and between the connectors and the junction blocks, provide electrical interconnection between these units.

The modular panels of a space-divider system may be configured such that adjacent panels are in a straight line or at various angular positions relative to each other. It is common to configure intersecting walls in such a fashion that three or four modular wall panels intersect at right angles. Each of the panels typically requires electrical outlets, and may require outlets on both sides of the panels. In any event, electrical power has to be provided to all of the panels and often only one of the panels at the multiple panel junction is connected to a power supply source. Under such circumstances, the interconnecting wiring becomes a significant problem, and special modifications may have to be made to power systems of wall panels used in such a configuration. Since interchangeability of the wall panels is highly desirable, such custom modifications are preferably avoided. Furthermore, modification of the panels at the installation site is bothersome and costly.

An example of a prior art system is shown in U.S. Pat. No. 4,135,775 to R. P. Driscoll (dated Jan. 23, 1979). In that patent, each panel is provided with an electrical outlet box in its raceway, and panels of different widths are provided with a pair of female connectors, and outlet boxes of adjacent panels are interconnected by means of flexible cables having male connectors at both ends. When three or four panels are adjoined in an intersecting arrangement, two cables may be connected to the pair of female connectors at one end of an outlet box in order to facilitate connection of two adjacent panels. Other than in the special intersecting relationship, one-half of the double set of terminals of this prior system is superfluous. This is a distinct disadvantage in modern-day systems where several independent electrical circuits are needed in wall panel systems, each requiring separate connectors, while space for such circuits and their connectors is very limited in the raceway areas of modern, thin-line wall panels.

U.S. Pat. No. 5,096,434 to Byrne, the subject matter of which is incorporated herein by reference, has attempted to overcome this problem by providing an interconnecting system in each wall panel comprising an electrical junction block having four receptacle connectors formed integral thereto for receiving electrical outlet receptacles and a pair of end connectors electrically connected to the junction block for connection to similar end connectors from adjacent panels. However, even with this system, it was found that some of the existing connectors were still not being used depending on various wall panel configurations.

SUMMARY OF THE INVENTION

These and other problems of the prior art are overcome by means of an interconnecting system comprising a single building block arrangement not requiring any special couplers for intersecting wall panels and in which all existing connectors are available for use in the various different panel configurations. An electrical interconnection assembly for each panel includes an electrical junction block having a plurality of receptacle connectors formed integral thereto for interchangeably receiving electrical outlet receptacles and power cables. One of the power cables attaches between a wall panel junction block and a power source for supplying power to the junction block. Other power cables can be connected between junction blocks of adjacent panels in order to supply power to the junction blocks and/or to any cables or outlet receptacles attached thereto.

In accordance with one aspect of the invention, each junction block is a two-sided junction block having two oppositely directed receptacle connectors and a single inside receptacle connector on each side of the junction block to accommodate electrical outlet receptacles or any combination of power cables and receptacles as may be required to obtain a desired interconnection arrangement. When two or more wall panels are arranged in an intersecting relationship, and due to the modular interchangeability of the junction blocks, it is possible that one or more of the receptacle connectors of the four oppositely directed receptacle connectors on the junction block will not be used. In this instance, additional outlet receptacles can be connected thereto for providing additional connections for power equipment.

BRIEF DESCRIPTION OF THE DRAWING

An illustrative embodiment of the invention is described in the following detailed description, with reference to the drawing in which:

FIG. 5 is an orthographic exploded view of an electrical interconnection assembly showing the attachment of an extension receptacle block;

FIG. 6 is an orthographic view of the assembled interconnection assembly of FIG. 5;

FIG. 7 is a side view of the assembled components of FIG. 6;

FIG. 8 is a plan view of the assembled components of FIG. 6;

FIG. 9 is an exploded orthographic view of an electrical interconnection assembly according to a further embodiment of the invention showing the attachment of a modified extension receptacle block; and FIG. 10 is an orthographic view of the assembled components of FIG. 9.

DETAILED DESCRIPTION

Figure 1:
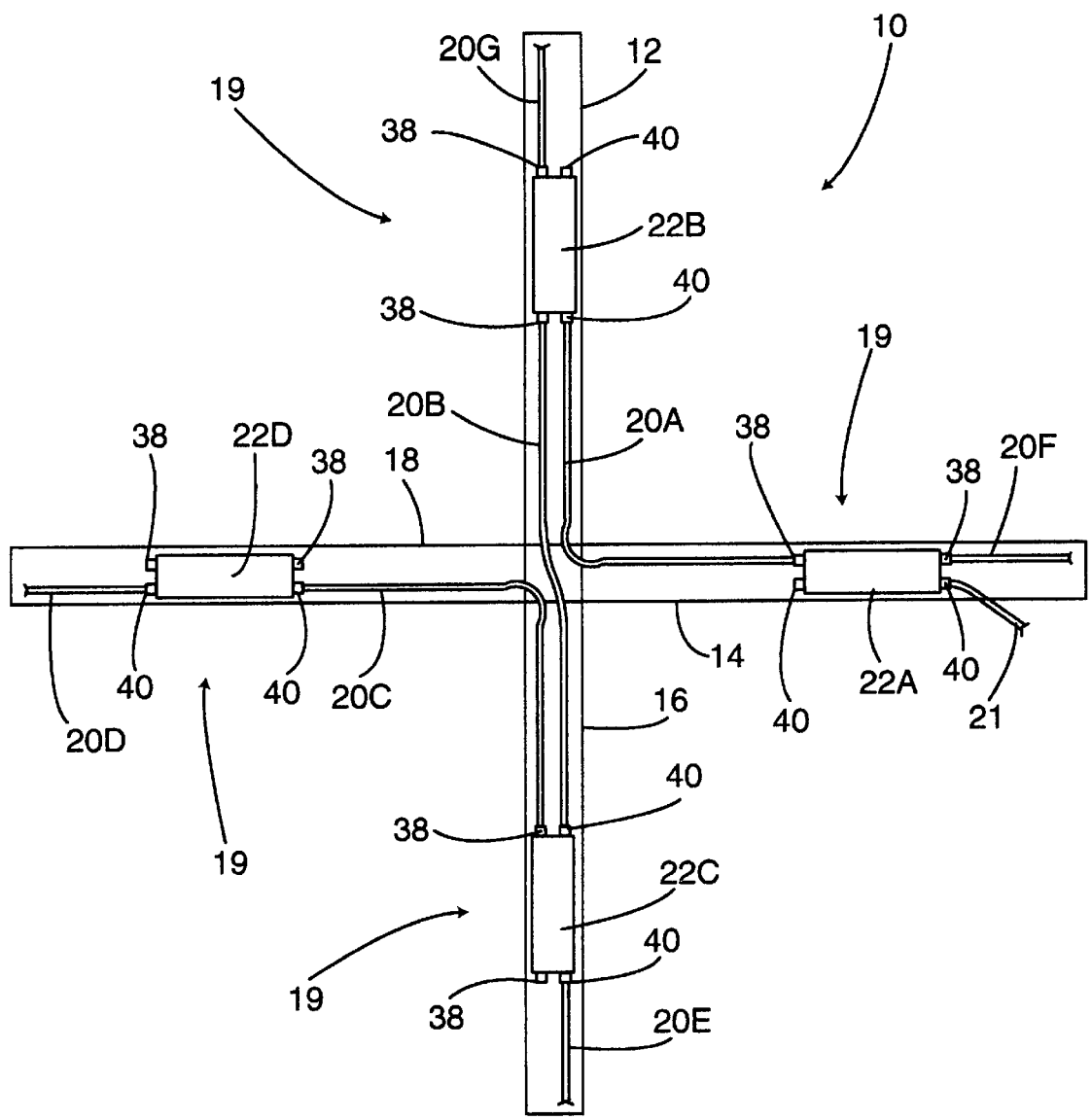
FIG. 1 is a fragmentary plan view of raceway areas of four wall panels, illustrating wall panel interconnections in accordance with the invention.
Figure 2:
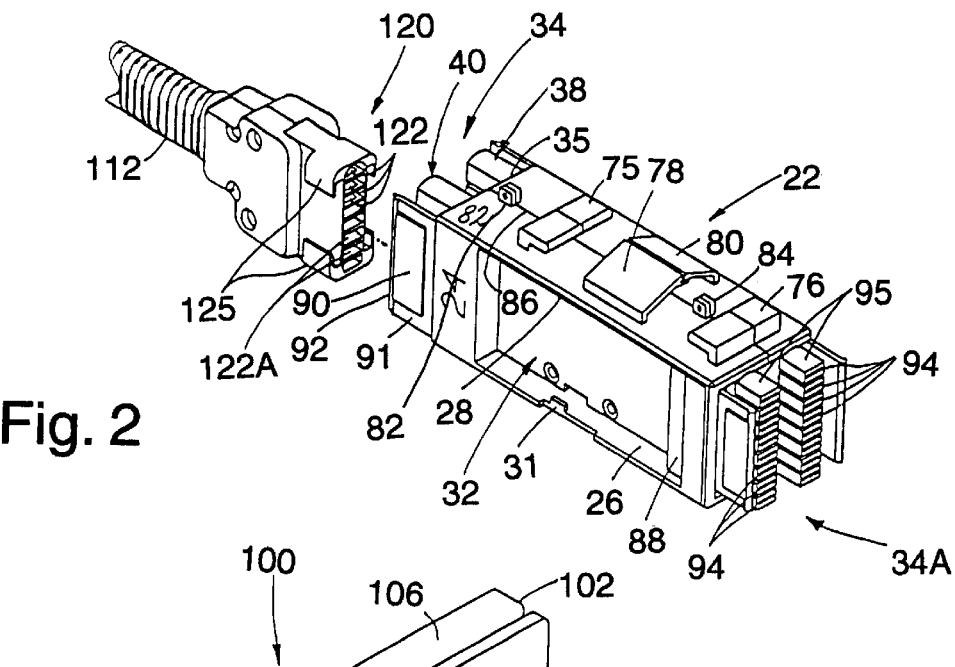
FIG. 2 is an enlarged perspective view of one of the junction blocks of an electrical interconnection assembly of FIG. 1.
Figure 3:
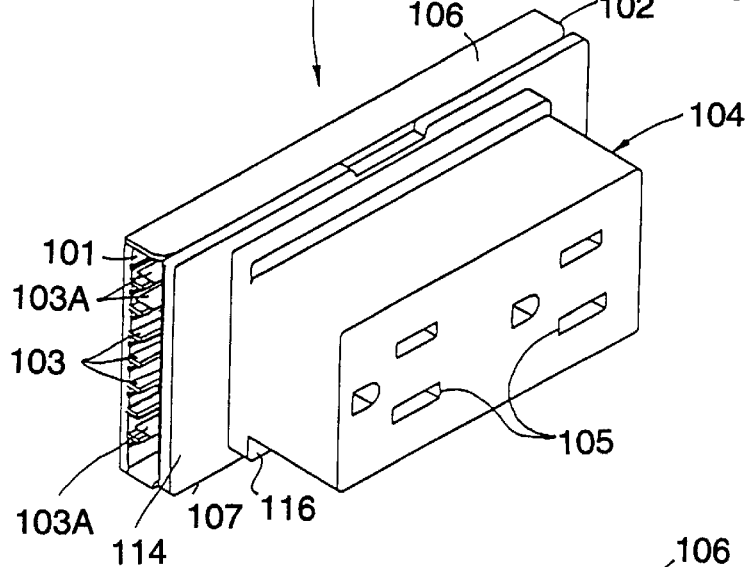
FIG. 3 is an enlarged orthographic view of a receptacle block for use with the present invention.
Figure 4:
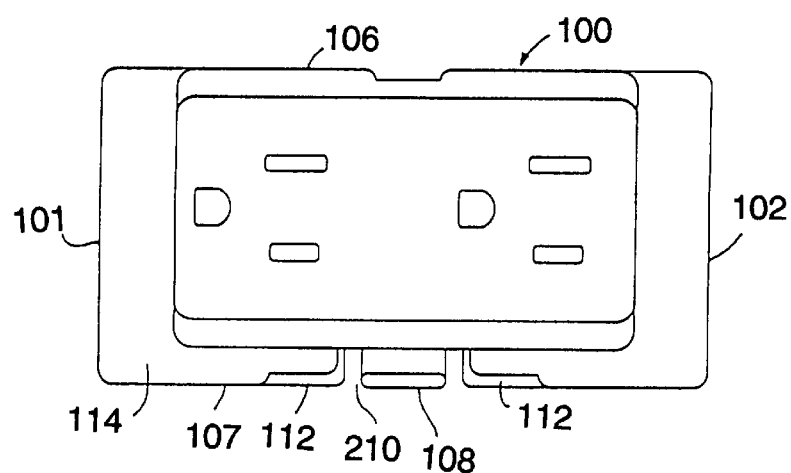
FIG. 4 is an enlarged side view of the receptacle block of FIG. 3.

FIG. 1 is a fragmentary plan view of raceway areas of four wall panels illustrating the connections of interconnection assemblies of the invention in a configuration in which the four panels are disposed at right angles to each other. As will be apparent from the following description, the specific angle at which the panels are positioned is not particularly significant. Furthermore, the invention is equally applicable to any number of panels configured at various angles. FIG. 1 shows the raceway portions 12, 14, 16, and 18 of a four-panel configuration 10 wherein the panels are disposed at right angles to each other. Each of the four panels is provided with an interconnection assembly 19, comprising one or more junction blocks 22 and power cable assemblies 20A–20F interconnecting the junction blocks 22. A junction block 22 is disposed within each panel raceway, such that opposite sides of the junction block can be exposed outside the raceway through raceway openings. Each junction block has a pair of recesses 32 (FIG. 2) for mounting one or more electrical outlet receptacle blocks 100 (FIGS. 3 and 4). Receptacle blocks 100 provide power to electrical equipment (not shown) located in proximity to the panels. Each junction block 22 includes a female connector block pair 34 at one end and a female connector block pair 34A at another end as illustrated in FIG. 2. Each female connector block pair 34, 34A can be independently interconnected to one or more power cable assemblies 20A–20F, and are each provided with two columns 38, 40 of a plurality of female connector terminals for connection to male connector terminals of the power cable assemblies. Column 38 is electrically connected to column 40 in a similar manner as described in my U.S. Pat. No. 5,096,434. As shown in FIG. 1, a power cable 21 connects junction block 22A to an external power source. Power cable assembly 20A electrically interconnects junction blocks 22A and 22B; power cable assembly 20B electrically interconnects junction blocks 22B and 22C; and power cable assembly 20C electrically interconnects junction blocks 22C and 22D. Thus, the single power cable 21 can provide power to all of the junction blocks through the power cable assemblies located in the wall panel configuration 10. Power cable assemblies 20D–20G are provided for the electrical connection of additional junction blocks (not shown) which may be part of the four-panel configuration or other panels.

Depending on the type of panel configuration used, one or more of the columns 38, 40 of the junction blocks may not be connected to a power cable assembly. Since column 38 is electrically interconnected to column 40, the unused columns have a ready source of power at their terminals. In this instance, according to an aspect of the invention, an extension receptacle block 150, 250 (FIGS. 5–10) can be provided for the electrical connection of additional power equipment. Extension blocks 150, 250 are described in greater detail below.

Additional details regarding the junction block 22 are illustrated in the enlarged orthographic view as shown in FIG. 2. The junction block 22 has a lower wall 26, an upper wall 28 and a middle wall 30 which form an open spatial area 32 on each side of the junction block 22 (only one side of which is illustrated in FIG. 2). In addition, the block 22 includes a female connector block pair 34 extending outwardly from a first end 35 of junction block 22, and a second female connector block pair 34A extending outwardly from a second end 35A of junction block 22. One female connector block pair 34 can be electrically connected to the other female connector block pair 34A of junction block 22 through internal wiring (not shown) in the junction block.

A female receptacle connector 88 is located within each half of junction block 22 within open spatial area 32. Electrical outlet receptacle blocks 100 (FIGS. 3 and 4) are adapted to engage the female receptacle connectors 88. In this manner, each of the junction blocks 22 is adapted to support, if desired, two electrical outlet receptacle blocks 100, one on each side of the junction block 22.

As shown in FIG. 2, female connector block pairs 34, 34A are each provided with a pair of side flanges 90 having upper and lower recessed areas 91, for engagement with flanges 125 of a male connector 120 which forms part of power cable assembly 20 (FIG. 1) or for engagement with flanges 225 of a male connector 220 of an extension block 150, 250 (FIGS. 5–10). Flanges 90 are made of a resilient plastic material and formed integral to the housing to which they are connected and are provided with an outwardly extending inclined end surface 92. When end surfaces 92 of the side flanges 90 are engaged by flanges 125 of male connector 120, the side flanges 90 will be deflected inward, allowing flanges 125 to engage recess areas 91 to provide a mechanical locking engagement of the male and female connectors. The female connector block pairs 34, 34A are each provided with two columns 38, 40 of a plurality of female connector terminals 94 and a key lug 95. Male connector portion 120 of cable assembly 20 is provided with a plurality of male connector terminal spaces 122 for the reception of male connector terminals 122A, and a key opening 124 for receiving key lug 95.

For the purpose of releasably securing junction block 22 to the wall panel raceways 12, 14, 16 and 18, a mounting system includes a pair of L-shaped mounting lugs 75, 76 and interlocking latch members 78, 80 are integrally mounted on or molded to the top of the upper wall 28. The junction block 22 may also be provided with connection lugs 82, 84 for securing preformed halves of the junction block 22 together along a seam line 86 as further illustrated in FIG. 2. This mounting system is similar to my U.S. Pat. No. 4,993,576, which is herein incorporated by reference. It is to be noted that the two halves of junction block 22 as defined by seam line 86 are identical and therefore a description with respect to one half of the junction block refers also to the other half.

Turning now to FIGS. 3 and 4, an electrical outlet receptacle block 100 for connection to female receptacles 88 of junction block 22 and female receptacles 188 of extension blocks 150, 250 (FIGS. 5–10) is shown. Receptacle block 100 includes a first open end 101 and a second open end 102. First and second open ends 101, 102 include a plurality of terminal spaces 103 for the reception of male terminals 103A for connection with a plurality of female terminals (not shown) located in the female receptacle connectors 88 on the junction block 22. An upper receptacle portion 104 includes one or more receptacles 105 for receiving receptacle plugs (not shown) of electrically operated equipment. An upper wall 106 and lower wall 107 are spaced apart in order to provide a snug fit between upper wall 28 and lower wall 26 of the junction and extension blocks. Receptacle 100 is provided with a spring latch 108 disposed in recess 110 in the lower wall 107 of receptacle 100. Lower wall 107 engages the lower wall 26 when the receptacle 200 is installed in the junction or extension blocks. The locking flange 31 on lower wall 26 will be aligned with recess 110 when the receptacle 100 is inserted between the upper and lower walls 28, 26, causing the spring latch 108 to be depressed. The receptacle 100 may then be moved to either the left or to the right (depending on which side of the junction block receptacle 100 is being installed) to engage one of the open ends 101, 102 such that male connectors 103 engage female connectors (not shown) with a female receptacle 88. Recesses 112 are provided in receptacle 100 to accommodate locking flange 31 on lower wall 26 and movement to either the left or the right by a sufficient distance will cause the spring latch 108 to be moved past locking flange 31, causing the spring latch 108 to return to its extended position. Hence, receptacle 100 will be retained in a locked position. The receptacle 100 may be removed by depressing spring latch 108 and sliding the receptacle 100 to either the left or right to align the locking flange 31 with recess 110.

Referring now to FIGS. 5–8, power cable assembly 20 includes electrical wires (not shown) disposed in a flexible conduit 112 and terminated on connectors (not shown) in male connector portion 120 for connection to junction block 22 as previously described. The conduit 112 is preferably a flexible conduit which may be bent to accommodate a connection to adjacent panels which are disposed at angular positions with respect to each other, rather than in a straight line.

An extension receptacle block 150 is adapted for connection to an unused column 38, 40 of female connector terminals 94. Receptacle block 150 has a receptacle block receiving portion similar to junction block 22 and includes a lower wall 126, an upper wall 128 and a middle wall 130 which form an open spatial area 132 on one side of extension block 150. A female receptacle connector 188 is located within open spatial area 132 and is adapted to engage an electrical outlet receptacle block 100 in a similar manner as connector 88 in junction block 22. In this manner, the extension block 150 is adapted to support a single outlet receptacle block 100 for supplying power to electrical equipment. A locking flange 131 provides the same function as locking flange 31 on junction block 22 for releasably locking the receptacle block 100.

Extension block 150 has a male connector portion 220 integrally formed or otherwise attached at one end thereof. The male connector portion 220 is similar to male connector portion 120 of power cable assembly 20 and includes flanges 225 to engage recess areas 91 of junction block 22 in a similar manner as flanges 125 of cable assembly 20 for providing a mechanical locking engagement of the male and female connectors. Male connector portion 220 of extension block 150 is provided with a plurality of male connector terminal spaces 222 for the reception of male connector terminals 222A and a key opening 224 for receiving key lug 95 of junction block 22. Although male connector portion 220 is shown attached at a single end of the extension block 150, it will be apparent that the connector portion 220 can be attached to the other end or both ends of the extension block. Moreover, although connector portion 220 is shown longitudinally attached to block 150, it is contemplated that connector portion 220 may be pivotally attached or fixed at an angle with respect to middle wall 130 of block 150. Extension block 150 includes a pair of spacedapart lugs 134 on upper wall 126 and lower wall 128 thereof for securing the extension block to a panel raceway through suitable fasteners (not shown).

FIGS. 9 and 10 show a modified extension block 250 having a receptacle portion 252 integrally formed or otherwise attached thereto. Receptacle portion 252 is electrically connected to a male portion 220. Male portion 220 is identical to male portion 220 of the previous embodiment, and therefore like elements are represented by like numerals. Receptacle portion 252 includes a lug 254 similar to lugs 152 in the previous embodiment for attaching extension block 250 to a panel raceway through suitable fasteners (not shown). As in the previous embodiment, although male connector portion 220 is shown attached at a single end of the extension block 250, it will be apparent that the connector portion 220 can be attached to the other end or both ends of the extension block. Moreover, although connector portion 220 is shown longitudinally attached to block 250, it is contemplated that connector portion 220 may be pivotally attached or fixed at an angle with respect to a plane defined along the length of block 250. Phantom lines in FIGS. 5 and 9 show how the separate components are attached.

The female receptacle connector 88 and the columns 38, 40 of female connector terminals 94 can each be provided with eight separate terminals for the reception of eight separate electrical wires (not shown) from a power cable assembly 20. By way of example, these may include two ground terminal wires, three neutral wires and three positive wires representing three separate circuits, with a shared ground for two of the circuits. Similarly, 10-wire or 12-wire systems may be readily accommodated, having corresponding numbers of terminals on each of the connectors and providing a greater number of separate circuits. Some of the separate circuits may be dedicated circuits having surge protection, battery back-up, etc. for computers or other electrically sensitive equipment.

Extension blocks 150, 250 can be attached to any junction block 22 having a free column 38, 40 of a plurality of female connector terminals 94, to thereby provide extra receptacle outlets for electrical equipment. According to a unique feature of the invention, the male connector portion 220 of the extension blocks 150, 250 and/or the male terminals 103A of receptacle block 100 can be configured to receive a specific electrical circuit, i.e. instead of providing eight separate male terminals, three male terminals 103A may be provided in terminal spaces 103 of receptacle block 100 or three male terminals 222A may be provided in spaces 222 of extension blocks 150, 250. The three male terminals would be placed in an appropriate terminal space for accessing ground, neutral, and positive lines present at the female terminals for creating a unique circuit at the extension block. The above-described arrangement permits an extension block 150, 250 to have a different electrical circuit than receptacle block 100 located within open spacial area 32 of junction block 22 for a dedicated line. The provision of separate electrical circuits to the junction block 22 and an attached extension block 150, 250 permits the creation of a separate dedicated circuit to a pre-existing wall panel configuration without rewiring or running a separate interconnection assembly 19.

Although the above description refers to a specific embodiment having a specific arrangement of male and female terminals with their mechanical interconnection, it is to be noted that such an arrangement is illustrative only. The male and female terminals and/or the mechanical interconnection may be reversed on the junction blocks, power cable assemblies, receptacle blocks, and extension blocks to produce similar results.

It will be understood that the embodiments disclosed herein are only illustrative of the invention and numerous other arrangements may be devised by those skilled in the art without departing from the spirit and scope of the invention.

What is claimed is:

1. An electrical interconnection assembly for use in a space-divider wall system including a plurality of modular upright wall panels having vertically extending opposite end edges and a raceway area extending between said opposite edges for supporting electrical conductors and junction blocks, said assembly adapted to be mounted in said raceway and comprising:

at least one junction block for receiving electrical receptacles;

a plurality of first receptacle connectors formed integral to said junction block for interchangeably receiving electrical outlet receptacles and at least one power cable;

said at least one power cable attaching between said junction block and a power source for supplying power to said junction block;

said junction block being a two-sided junction block with at least two of said first receptacle connectors being oppositely directed, said junction block further comprising at least one inside second receptacle connector on at least one side of said junction block to accommodate electrical outlet receptacles;

an extension receptacle block connected to one of said oppositely directed first receptacle connectors on said junction block for providing additional connections for power equipment, said extension receptacle block comprising a further inside second receptacle connector; and a further electrical outlet receptacle connected to said further inside second receptacle connector.

2. An electrical interconnection assembly in accordance with claim 1, characterized in that said junction block comprises at least one of said second receptacle connectors on each of two opposing sides of said junction block.

3. An electrical interconnection assembly in accordance with claim 1, characterized in that said assembly further comprises an electrical outlet receptacle integrally formed with said extension receptacle block.

* * * * *